United States Patent [19]

Smorenburg

[11] 3,986,832
[45] Oct. 19, 1976

[54] APPARATUS FOR THE THERMAL TREATMENT OF COMMODITIES PACKED IN CONTAINERS

[75] Inventor: Johannes Jacobus Smorenburg, Abcoude, Netherlands

[73] Assignee: Stork Amsterdam B.V., Amstelveen, Netherlands

[22] Filed: July 5, 1974

[21] Appl. No.: 486,207

[30] Foreign Application Priority Data
July 10, 1973 Netherlands.................... 7009638

[52] U.S. Cl.................................. 21/80; 21/94; 21/103; 261/78 A; 261/DIG. 76; 426/407; 426/412
[51] Int. Cl.².................... A61L 1/00; A23L 3/04
[58] Field of Search .......... 426/401, 407, 408, 412, 426/232, 325; 99/361, 362, 366, 368, 370; 261/78 A, DIG. 76; 21/80, 94, 95, 103

[56] References Cited
UNITED STATES PATENTS

| | | | |
|---|---|---|---|
| 3,377,173 | 4/1968 | Van Der Winden................. | 432/18 |
| 3,407,721 | 10/1968 | Carvallo........................... | 99/368 X |
| 3,445,179 | 5/1969 | Jansen ............................. | 99/362 X |
| 3,469,988 | 9/1969 | Yawger............................. | 426/407 |
| 3,590,841 | 7/1971 | Reimers........................... | 99/370 X |
| 3,615,725 | 10/1971 | Van Der Winden................ | 426/408 |
| 3,619,126 | 11/1971 | Carvallo........................... | 99/361 X |

Primary Examiner—Frank W. Lutter
Assistant Examiner—N. Greenblum
Attorney, Agent, or Firm—Haseltine, Lake & Waters

[57] ABSTRACT

A method and apparatus for operating a continuous process apparatus in which commodities packed in containers receive thermal sterilizing treatment, wherein the containers are introduced by means of an endless conveyor and through a pressure resistant opening, into a treatment space and are traversed through a loop-shaped path in this space and thereupon are discharged therefrom through a pressure resistant outlet, including injecting saturated steam at the desired treatment temperature through a number of nozzles into the treatment space directed towards the passing containers for the transfer of heat, concurrently introducing air for maintaining the level of the desired overpressure in order to avoid a deformation of the containers. Furthermore, at the upper side of the treatment space water is supplied at the desired treatment temperature, part of the down-flowing water being collected in gutters positioned between the loops of the conveyor and being warmed up under the influence of the steam issuing from the nozzles under these gutters over at least a part of the width of the treatment space, so as to produce an optimum mixture of the atmosphere.

3 Claims, 3 Drawing Figures

APPARATUS FOR THE THERMAL TREATMENT OF COMMODITIES PACKED IN CONTAINERS

BACKGROUND OF THE INVENTION

My invention relates to a method known from British Pat. No. 1,135,148 for operating a continuous process apparatus in which commodities packed in containers receive thermal treatment, wherein the containers by means of an endless conveyor, via a pressure resistant opening, are introduced into a treatment space and are traversed through a loop-shaped path in this space and hereinafter are again discharged therefrom via a pressure resistant outlet said method further comprising the injection of saturated steam at the desired treatment temperature into the treatment space for the heat transfer, whilst air is also introduced for maintaining the level of the desired overpressure in order to avoid a deformation of the containers, and finally on the upper side of the treatment space water is supplied at the desired treatment temperature.

In this known method a certain overpressure is maintained within the treatment space, said pressure being required to prevent the containers from being deformed as a consequence of the rise of the inner pressure. This so called "over-pressure" is obtained by feeding a non-condensable gas, preferably air which together with the supplied dripping water and the steam constitutes the treatment mixture within the space.

A steam-air mixture without the addition of water has the drawback that the transfer of heat by means of condensation of the steam is impaired by the presence of the air. When steam from the surroundings of the packed commodities condenses on the containers or on the carriers for the containers, the air rests more or less in those surroundings. This air constitutes therefore an insulating layer around the containers or carriers, whereby the admission of fresh steam is prevented or at least impeded.

DISCUSSION OF THE PRIOR ART

Also other systems of thermal treatment of the commodities packed in containers are known. So e.g. the thermal treatment in an atmosphere of "over-pressure", whereby the thermal treatment is effected by means of spraying or clouding water drops (see e.g. the French Pat. No. 1,391,729 combined with the first addition 82,267 and the second addition 85,597).

In this case heat transfer is produced which is not interfered with by the air insulation which is present, but this method of heat transfer is not optimal, since the hot water, which is sprayed on the so-called "carriers" often will not reach the wall of the container proper. This is notably the case when foodstuffs packed in very flexible containers (so-called pouches) are treated. In some cases the holes in the carriers, through which the water should flow, must be kept rather small to prevent the containers from being caught in the carriers. Moreover there is the drawback of the lower temperature of the spray water as seen in the direction of flow. This initially hot water gives out its heat by means of convective heat transfer and will thereby lower in temperature. Even when the surrounding of the water is a saturated atmosphere, the temperature in the whole tower will not be homogeneous. As a consequence no optimal process conditions are produced which then again impairs the quality of the final product. A further disadvantage of pure spray water-air systems lies in the fact that much water will splash off the carriers.

The systems in which only steam and vapour are used have not only the drawback that the insulating air layer remains when the steam condenses, but also that difficulties will be experienced when air and steam are to be mixed in an optimal way. The tower through which the conveyor with the containers passes is for a greater part filled by those containers. The remaining spaces present inadequate openings to realize a proper flow of air and vapour, so that no optimal mixture of said two components can be obtained. This continuously required optimal mixture is necessary in order to obtain in the entire space the same heat transfer and also the same temperature of the food stuffs packed in the containers.

Summarizing it can be said that the currently known systems: steam/air or water/air or steam/water/air have many drawbacks which present obstacles in obtaining an assured homogeneous atmosphere in the treatment space and which also are an impedance in realizing at any location a good direct heat transfer.

SUMMARY OF THE INVENTION

It is an object of my invention to improve these known systems in a more efficient way in order to attain an optimal heat transfer and to ensure also a very homogeneous atmosphere in the entire treatment space. The starting point in that each medium is introduced in such a way into the treatment space that the advantages inherent in each medium show to full advantage.

These objects are attained according to my invention by the arrangement that the saturated steam is injected through a number of nozzles into the treatment space directed to the passing containers, and in that part of the down flowing water is collected in gutters positioned between the loops of the conveyor and is warmed up under the influence of the steam issuing from the nozzles under these gutters over at least a part of the width of the treatment space, such that there occurs an optimum mixture of the atmosphere.

Due to these features the heat transfer required for the treatment aimed at its obtained through the saturated steam. For in each point where the temperature falls under the temperature of the saturated steam, a condensation of supplied steam will immediately be produced with simultaneous transfer of the condensation heat. Also the normally inaccessible points where spray water cannot reach can now be reached by the steam atmosphere. An important advantage of my invention is the fast regulation of the temperature; in case of an emergency stop owing to a disturbance, the supply of steam and water can be shut off. As a consequence none or calories only in small quantities will be transferred any further to the containers within the treatment space.

The points at which air and steam are introduced will be selected in such a way that an optimal distribution thereof is obtained in the space. Finally water is added as a third component which is to be metered to the full width of the treatment space and distributed on the surface in such a manner that a "rain fall" is produced which results in a thorough mixing of steam/air atmosphere. The water is brought up to the desired temperature by means of steam injection into the feed pipe for the water e.g. in a way as described in U.S. Pat. No.

3,193,257. In this way there will be avoided that cold spots from in the treatment space when a quantity of fresh air is supplied. The water flowing down over the full width will induce a mixture of said spots of cold air with the steam and as a consequence the water will cool itself down, but the continuously injected fresh steam will then ensure the warming up of the cooled down drops.

The spray water will also have a secondary heat transfer promoting effect, for it will give out heat when it is in contact with a cold wall or with a container. This is not disadvantageous since the steam will immediately condense at the locations at which the spray water cools down and thereby heat is again supplied. In this manner the condensation heat transfer, coming from the steam, is optimally utilized, while the trouble normally caused when air is added — namely cold spots and non-homogeneous atmosphere — can be overcome in a simple way by adding the water curtain in a correct manner. Both along the width and along the vertical length the temperatures remain now almost constant.

My invention relates further to an apparatus for passing commodities packed in containers through a thermal treatment, comprising an treatment space, an endless conveyor following a loop-shaped path through this space and entering this space and leaving same via a pressure resistant inlet and outlet, a station for loading the containers into carriers of the conveyor and discharging the containers therefrom, while saturated steam and a gas such as air is injected into the treatment space, a plurality of nozzles being disposed at the upper end of the treatment space for feeding water.

According to my invention a number of perforated water receiving gutters are disposed at various levels in the treatment space between the loops of the conveyor while under each gutter a steam injector is provided with which the water flowing out of the gutter is projected against the passing containers. The water will flow through the perforations and possibly over the brim of the gutters and thereupon be redistributed and warmed up by the steam injector. As a consequence the homogenity of the temperature and of the composition of the treatment mediums at different levels in the treatment space is promoted.

SURVEY OF THE DRAWINGS

DESCRIPTION OF PREFERRED EMBODIMENTS

Figure 1:
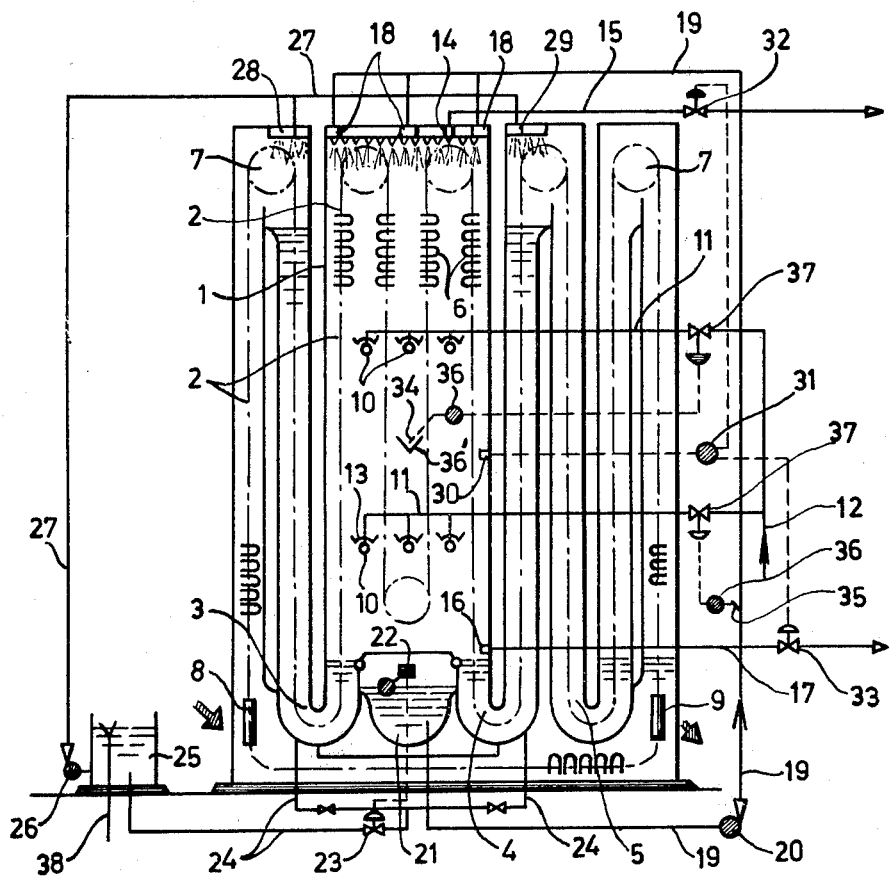
FIG. 1 shows a first embodiment in which the supply of water is also effected between the various loops of the conveyor within the treatment space.

As is seen in FIG. 1 the apparatus consists of a treatment space 1 provided with a conveyor 2 following a loop-shaped path through this space. The conveyor 2 enters the space 1 via a pressure resistant inlet consisting of a U-shaped water seal 3 on the one side of the space 1. The conveyor leaves the space via a corresponding pressure resistant outlet, likewise consisting of a U-shaped water seal, on the other side of the treatment space 1. The conveyor 2 follows another loop-shaped path 5 beyond the water seal 4 on which the contents of the carriers 6 of the conveyor can be cooled down. Sprocket wheels 7 are mounted along the upper side of the apparatus, while the closing portion of the path followed by the conveyor 2 is constituted by the part beyond the wheel 7 on the extreme right up to the part running over the wheel 7 on the extreme left in FIG. 1. In the latter part of the path a station 8 for loading and a station 9 for unloading the carriers 6 is provided. The containers which are loaded and unloaded consist e.g. of bottles, tins jars, plastic bags or pouches. The apparatus described is particularly adapted to passing the latter type of containers through thermal treatment.

So far the apparatus described is in principle not distinguished from the state of the art. According to my invention there is provided a combination which allows the apparatus to operate in such a way that an optimal thermal treatment of the containers becomes possible. In the first place a plurality of steam injectors 10 are provided in the space 1, which are connected via pipes 11 with a feeder 12 for steam. Each injector 10 is disposed under a receiving gutter 13 provided with a perforated bottom.

A feed member 14 for gas, like air, is situated in the proximity of the upper side of the space 1. This air is fed via a duct 15. Near the bottom of the space 1 a discharge member 16 is provided with a duct 17 for decreasing the pressure within this space. Finally a plurality of nozzles 18 are disposed on the upper side of the treatment space 1 for feeding water. These nozzles are connected, via a pipe 19 and a pump 20, with a receptacle 21 constituting the bottom of the treatment space. A float 22 is disposed within this receptacle for giving a signal to a feed-and discharge pump 23 arranged in a duct 24 which on the one hand opens into a buffer vessel 25 and on the other hand communicates with the lower side of the liquid seals 3 and 4.

The whole water balance of the apparatus can be regulated by means of a single float, which ensures that all the excess water is discharged to the buffer vessel. Since this water is coming from the water seals the temperature thereof will be below 100°C and no sudden formation of vapour will arise in the buffer vessel. This would be the case if the float in the receptacle produced a direct regulation of the water level in this receptacle, since the water temperature therein (owing to overpressure) is above 100°C.

Via a pump 26 and a duct 27 the vessel 25 is connected with two spray members 28 and 29, arranged above the liquid seals 3, 4, for warming and cooling carriers 6. Arranged within the treatment space 1 is a pressure sensor 30 which via a regulator 31 can emit a signal to a shut off valve 32 in the supply duct 15 for the air to a shut off valve 33 in the discharge duct 17 for the gas. The apparatus is further provided with two temperature measuring instruments 34 and 35. The first is disposed in a receptacle 36 for the water, which is mounted halfway the height of the space 1. The other instrument 35 is ounted in the duct 19 which directly communicates with the receptacle 21. Both temperature measuring instruments 34 and 35 communicate via a control device 36 with a shut off valve 37 in the upper and lower steam feed pipes 11, respectively.

During the operation of the apparatus described hereinbefore, after a starting period, a situation will arise which is depicted in FIG. 1. In that case a certain overpressure will be produced in the treatment space 1, the extent of this overpressure being directly connected with the difference in height of the liquid columns in the U-shaped water seals 3 and 4. The regulation of the desired temperature is effected by means of the temperature measuring instruments 35 and 34 which control the supply of steam via the injectors 10 in both the upper and the lower part of the space 1. Since the temperature in the lower part always tends to be lower than the temperature in the upper part of the space 1 the quantity of steam injected via the lower duct 11 will be greater than that injected via the upper duct. This assists in maintaining the temperature of the moist atmosphere within the space as uniform as possible over the entire height.

The pressure in the space 1 is controlled by means of the pressure gauge 30 which when the pressure falls below the desired value opens the valve 32 and when the pressure rises to above the desired value opens the value 33.

The water transmitted via the duct 19 and the pump 20 to the nozzles 18 will mostly contain chemicals which are added thereto in order to form an anti-corrosive (phosphate) layer. The chief purpose of this water is, however, to create turbulence in the atmosphere within the space in order to maintain in this way a more uniform temperature thereof over the entire height of the space.

The level in the receptacle 21 is regulated by supply and discharge of water to the seals 3 and 4. For that purpose the temperature in the buffer vessel 25 is maintained at about 70°C so that the water fed to these water seals 3 and 4 also has this temperature. In the water seal 3, which besides its sealing function also has a warming up effect on the carriers 6 of the conveyor 2, the temperature will have on the average a lower value which e.g. is about 60°C.

In the water seal 4, which ensures a first cooling of the treated carriers 6, the temperature will on the average be higher than the aforementioned 70° of the buffer vessel 25. On an average the temperature in the seal 4 will rise to about 80°C. In case of a regular advance of the conveyor 2 with filled carriers 6 there will be established an equilibrium and no additional measures will be necessary for maintaining the temperature of the water seal 3 and the water seal 4 at the desired value. Since in operation mostly a surplus of water flows to the receptacle 21, water almost always will be discharged via the duct 24 to the buffer vessel 25.

When the loading is temporarily discontinued at the station 8 and when the conveyor keeps moving then the deficient volume (empty carriers) will have to be supplemented by water from the vessel 25, via the duct 24, to the seals 3 and 4. The level in the vessel 25 will then temporarily fall. As soon as the loading at the station 8 is recommenced, the surplus of water is returned, via the duct 24 to the vessel 25. The standpipe 38 ensures a limitation of the upper level in the buffer vessel 25. It should be noted that the warming up, if any, of the water fed to the nozzles 18 by a steam supply can be brought up to and maintained at the desired temperature by means of the provision described in U.S. Pat. No. 3,193,257.

Figure 3:
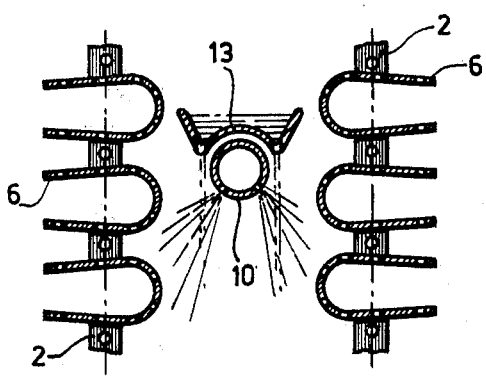
FIG. 3 shows a detail of a water receiving gutter with a supply duct for steam disposed thereunder.

The method and the apparatus according to my invention allow for maintaining a greater homogeneity of the atmosphere within the treatment space 1 because there is always a considerable turbulence within this space whereby the formation of areas with deviating tempertures is avoided. This turbulence is also stimulated by the injectors since the outflow direction of the steam is such that the water collected in the gutters 13 and flowing therefrom is hit by the steam jets and while being simultaneously warmed up is redistributed over the space 1 (see FIG. 3).

Figure 2:
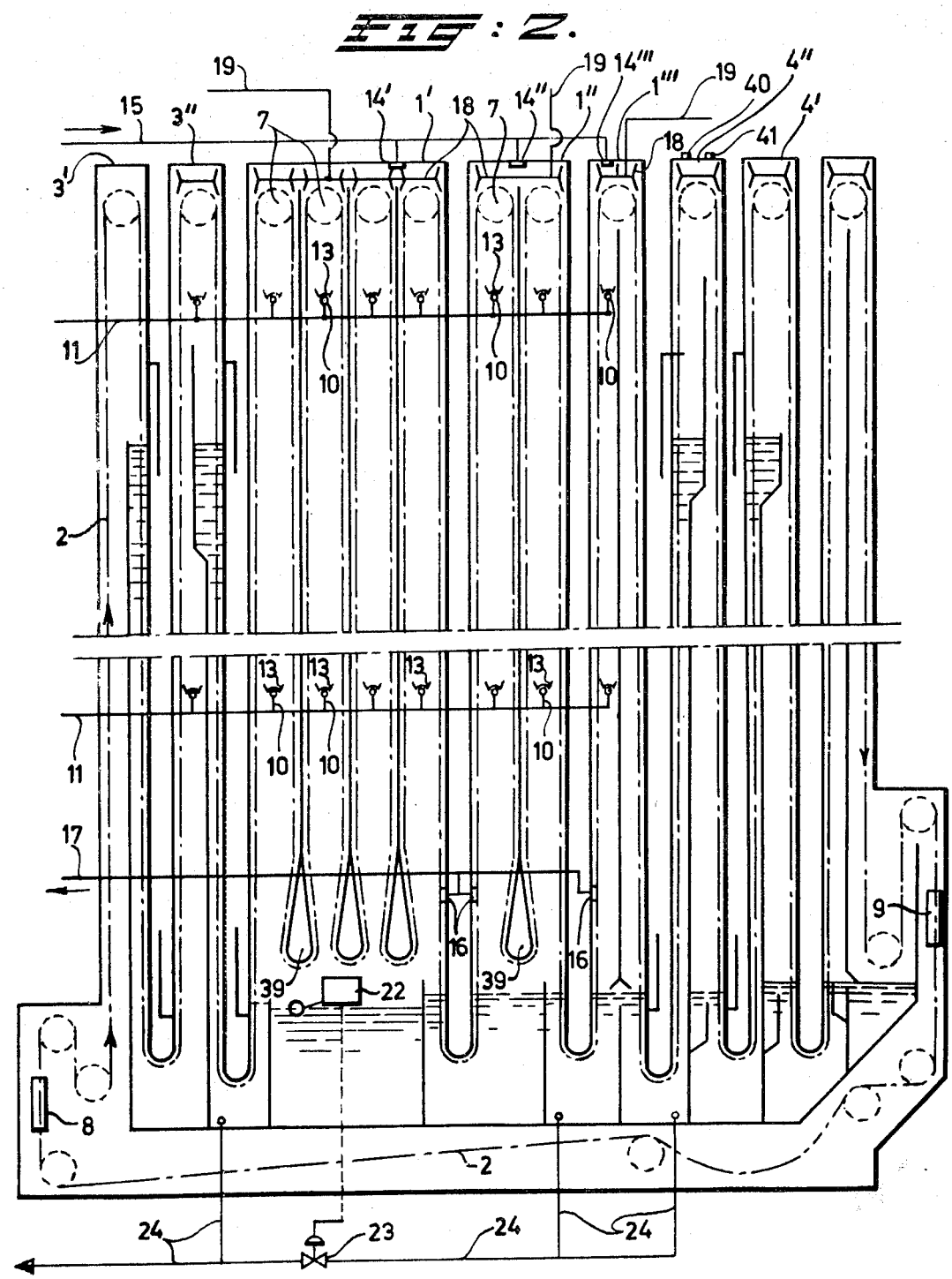
FIG. 2 is another embodiment of the apparatus.

The embodiment according to FIG. 2 corresponds substantially with the apparatus according to FIG. 1 and is distinguished therefrom in two important respects namely in that the treatment space consists of three columns. The water seals 3' and 3'' and 4' and 4'' allow (in a way known per se) with respect to the device according to FIG. 1 either to double the operative pressure within the treatment space or to halve the height of the apparatus. The three columns of the treatment space 1', 1'' and 1''' allow one to use a very long treatment path of the conveyor 2 for which purpose the apparatus also in the direction of its width is compact due to the use of closely spaced upper sprockets 7. The loop-shaped path consists in this case of four loops each provided at their lower end with a drop-shaped guide member 39.

The rest the apparatus according to FIG. 2 contains the same members with which it is possible to operate the device in such a manner that an optimal thermal treatment of the containers becomes possible. A plurality of steam injectors 10 with receiving gutters 13 thereabove are connected to a duct 11. There are further three feed members 14', 14'' and 14''' for a gas like air near the upper part of the spaces 1', 1'' and 1''', which members are connected to a duct 15. Near the lower part of the three spaces 1', 1'' and 1''', a discharge member 16', 16'' and 16''' with a common duct 17 is disposed for decreasing the pressure within these spaces. Finally a plurality of nozzles 18 for feeding water via a pipe 19 is arranged at the upper end of the three treatment spaces.

It should be noted that a temperature controller can be arranged in the water seal 3, 3' and 3'', respectively in connection with the dual function of this column which not only should provide a sealing from the pressure prevailing in the treatment space 1 but also a warming up of the not yet treated containers supplied from the loading station 8. In the modification according to FIG. 2 the duct 17 also serves to keep the pressure within the spaces 1', 1'' and 1''' exactly equal.

At the lower end of the treatment space 1' the float 22 is provided emitting a signal to a shut off valve 23 for discharging water from the lower end of the water seals 3'' and 4'' via the ducts 24 to the buffer vessel 25 (not shown).

It should be noted that at the upper end of the column 4'' there is provided an inlet 40, 41 for air and cooling water in conformity with the system as described in U.S. Pat. No. 3,377,173.

What I claim is:

1. An apparatus for passing commodities packed in containers through a thermal sterilizing process, consisting of a treatment space, and endless conveyor supporting a plurality of said containers in spaced relationship; means conveying said conveyor along a loop-shaped path through this space, said conveyor entering this space and leaving same through respectively a pressure resistant inlet and outlet, a station for loading containers into carriers mounted on the conveyor and for discharging the containers therefrom, means for injecting saturated steam and means for injecting a gas into the treatment space, a plurality of nozzles being disposed at the upper end of the treatment space for feeding water into said space, a plurality of perforated water receiving gutters being disposed at different levels in the treatment space between the loops of the conveyor, and a steam injector being provided under each gutter.

2. An apparatus according to claim 1, wherein the pressure resistant feed- and discharge opening consists of a U-shaped seal disposed on either side of the treatment space, while the bottom of this space constitutes a receptacle containing a supply of water from which water is pumped to the nozzles, a buffer vessel for the liquid being provided outside the treatment space, wherein a supply- and discharge duct for the liquid is provided between the buffer vessel and the lower end of the liquid seals, and a float being disposed in the receptacle, and means for generating a signal responsive to the level of the float in said receptacle for regulating the flow in the supply- and discharge duct.

3. An apparatus according to claim 2, wherein a temperature measuring instrument is disposed halfway up the height of the treatment space in one of said water receiving gutters, and another temperature measuring instrument is disposed in the receptacle, said instruments generating signals for regulating means controlling the supply to the steam injectors in the upper and lower part of the space.

* * * * *